Sept. 14, 1937. B. NEGRINI 2,093,054
BLADE MEMBER FOR RIGID ROLLER BLINDS
Filed Jan. 12, 1935 3 Sheets—Sheet 1
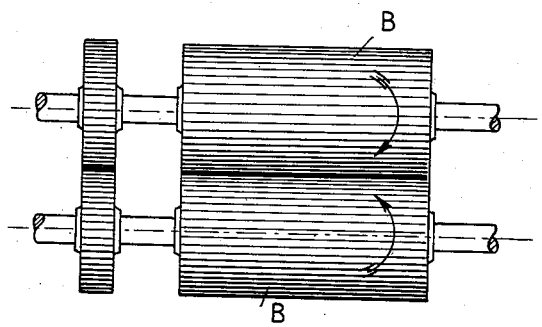
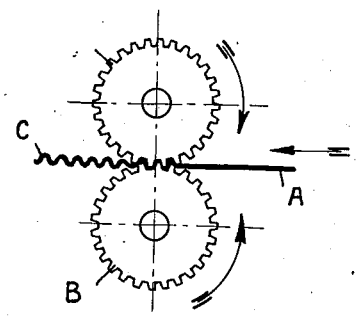
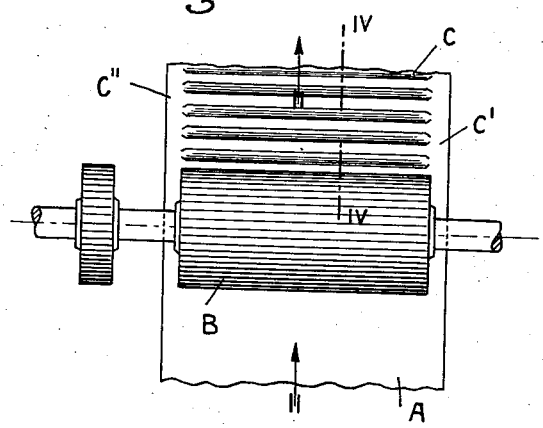
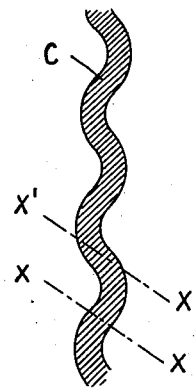
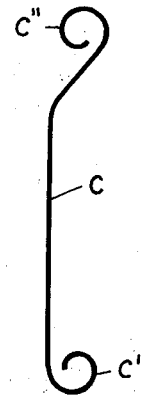
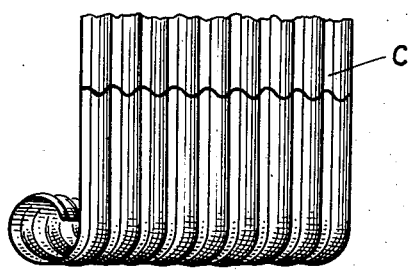
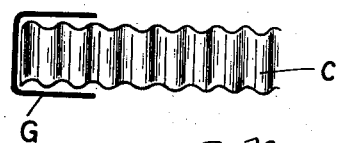
B. Negrini
INVENTOR Sept. 14, 1937.  B. NEGRINI  2,093,054
BLADE MEMBER FOR RIGID ROLLER BLINDS
Filed Jan. 12, 1935   3 Sheets-Sheet 3
Fig. 15
Fig. 16
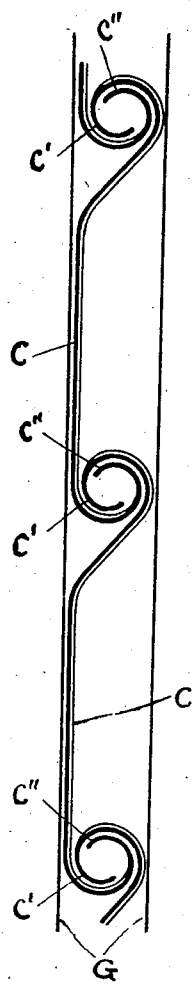
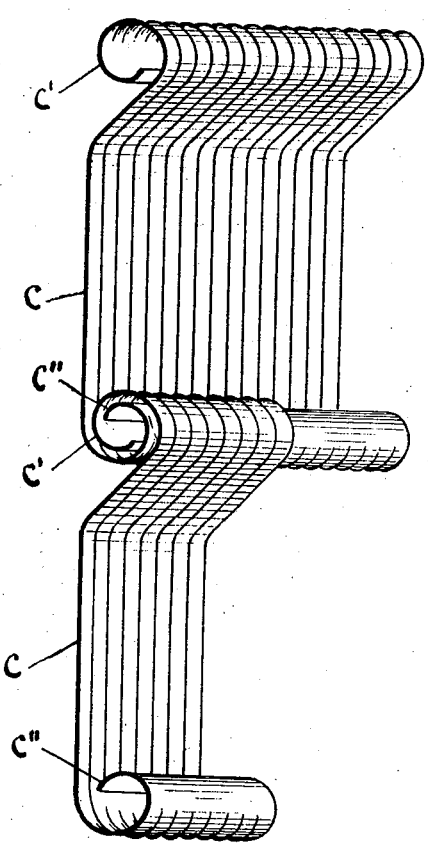
B. Negrini
Inventor
By Glascock Downing & Seebold
Attys.

Patented Sept. 14, 1937

2,093,054

UNITED STATES PATENT OFFICE 2,093,054

BLADE MEMBER FOR RIGID ROLLER BLINDS

Bruno Negrini, Bologna, Italy

Application January 12, 1935, Serial No. 1,556
In Italy January 12, 1934

5 Claims. (Cl. 189—56)

The present invention relates to roller blinds and like appliances, and it has for its object a new kind of blade member for the manufacture of rigid roller blinds, these blade members being characterized in that they are provided with corrugations in a direction perpendicular to the two longitudinal edges curved in the shape of a spiral.

Up to now, it was considered very difficult, almost impossible to constitute spirally curved edges by using plates provided with corrugations which are perpendicular to the long edges, that is to say in the direction of the height, on the portions intended to be curved.

The invention will be better understood with the help of the following description referring to the appended drawings in which:

Figs. 1 and 2 show in front and side view one of the preferred manners of forming the corrugations on the metallic strip intended for the manufacture of blades for roller blinds.

Fig. 3 is a variation of realization of the process of manufacture according to Figs. 1 and 2.

Fig. 4 is a section on a larger scale of a detail of a plate with corrugations.

Fig. 5 is a side view of a shape of plate with corrugations.

Fig. 6 is a view of detail of a part of a plate with corrugations and of one of the guides.

Fig. 7 shows the lower part of a plate provided with corrugations up to its edge.

Figs. 15 and 16 are fragmentary vertical sectional and perspective views respectively of a modification to Fig. 7.

In accordance with the invention, the manufacture of plates with corrugations is performed in the following manner:

Use is made of pairs of fluted horizontal cylinders, or formed with portions in relief having the shape of the hollow portions of the adjacent cylinder.

The simplest and most practical shape of cylinders of this kind is shown in Figs. 1 to 3. Preferably, one of the cylinders B is power driven and the other is free to turn about its axis, so that the driven cylinder drives the free cylinder, and the strip of sheet metal A, forced along in its turn by the rotating cylinders, is completely corrugated as shown at C in Figs. 2 and 3.

Naturally, when relatively large thicknesses of sheet metal are concerned, one can place several pairs of fluted cylinders in series, the axes of which are gradually nearer to each other, until the desired shape of corrugations is produced. These cylinders may be constituted by the first pairs of cylinders of an edging machine having several pairs of horizontal cylinders.

The blade members so provided with corrugations are then edged in the usual manner, but preferably more gradually, and this particularly in the case of great thicknesses of sheet iron or else of very marked corrugations or reliefs.

Fig. 7 shows the lower portion of a blade member completely corrugated, that is to say provided with vertical corrugations perpendicular to the edge of the blade member, extending right up to the edges of the said blade member.

In practice, it has been found that it is more suitable for the purpose of obtaining even still more rigid blade members, to leave free from corrugations a portion of the margin at the edges of the blade members of a width equal to about ½ to ⅓ of the total length of the spirals connecting the blade members to each other. The rigidity of the blade members corrugated in this manner becomes still greater owing to the effect of the reaction between the ends of the corrugations and the portion without corrugations and the assembling of the blind is rendered easier.

Figure 8:
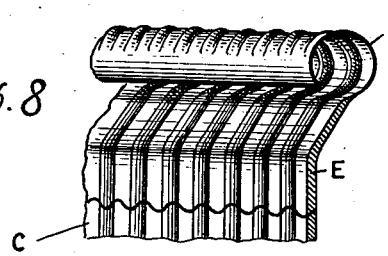
Fig. 8 shows the upper part of a blade member similar to that shown on Fig. 7, in which the corrugations do not extend up to the edge of the curved portion.

The process of manufacture of these blade members is shown in detail in Fig. 3, the non-corrugated portions being indicated by C' and C''. Fig. 5 shows the position of these parts in a curved blade member according to a patent of applicant's. The upper portion of this blade member is shown in perspective in Fig. 8.

Figure 9:
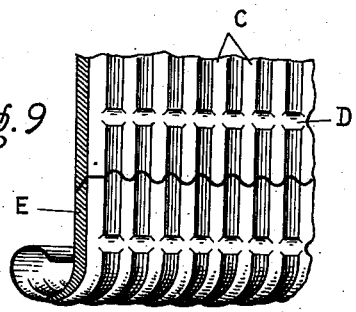
Figs. 9 to 14 show variations of realization of plates with corrugations according to the invention.
Figure 10:
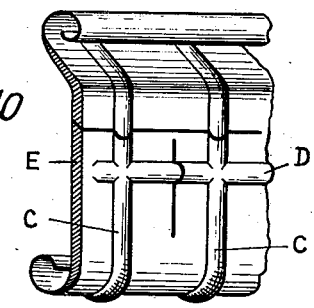
Figure 12:
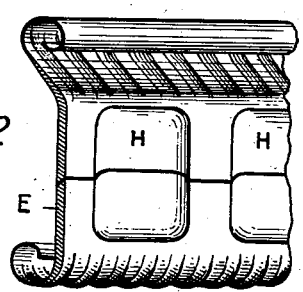

Figs. 9 and 10 show, as examples only, two other blade members with vertical and horizontal corrugations C and D, respectively. In some cases it is also suitable to fold at right angles the lateral edges of the blade members or to provide them with reinforcing flanges, as shown at E in Figs. 9, 10 and 12. It is understood that these flanges decrease towards the portions curved in spiral, and are themselves equivalent to corrugations, and they can therefore be provided even to blade members without corrugations on their bodies.

Besides a greater resistance of the corrugated blade members compared to the smooth blade members, the former have the advantage of allowing a smoother sliding of the edges of the blind in their lateral guides or slides G, Fig. 6, owing to the considerable reduction of the frictional area, which, in the case of corrugated blade members, is no longer a true surface constituted by an infinite number of straight lines, but is limited to a finite and generally very small number of lines of contact, constituted by the edges of the corrugations.

In the case of simple flanges E on the margin, formed on blade members without corrugations, the frictional surface is reduced on the one hand to the plane marginal surface embraced by the guides, and on the other hand to the thickness of the material used.

In Figs. 15 and 16 the unribbed parts of the spirally curved edges are respectively indicated by the reference letters C' and C'' and the guide members are indicated by G as in Figure 6. From this figure is apparent the position of the spiral edges and of the vertical ribs with regard to the guide members and is also apparent that by leaving the parts C' and C'' unribbed the assembling of the slats is rendered easier, as the ribbed parts of the spiral edges contact with the smooth parts of the spiral edges of the adjacent slat.

Among the advantages derived from the corrugated blade members, one may mention the following ones:

1. Since the formation of corrugations is particularly suitable for relatively thin sheet metal, one realizes a considerable economy in the manufacture of roller blinds of costly materials, such as aluminium alloys, stainless steel, brass, etc.

2. Considerable reduction of the friction between the guides.

3. The blade members offer a shearing resistance which is proportional to the height of the corrugations. This advantage is evident when one examines Fig. 4, in which the lines $x$—$x$ and $x'$—$x'$, parallel to each other, represent the lines of shear under consideration. By measuring the length of the portions of these lines meeting the material, it is evident that in the case of corrugations having the characteristics shown, the resistance to shearing is increased at the rate of 18:10 approximately with respect to the resistance of smooth sheet metal. This increase of resistance must however not be considered as a limit.

It is understood that the invention is not limited to blade members provided with vertical corrugations properly so called, but the body of the blade member may be free from corrugations, or be fluted, corrugated or stamped in any other manner, provided that a portion of the curved edges be provided with vertical corrugations. Examples of construction of these forms of blade members are shown in Figs. 11 to 14.

Figure 13:
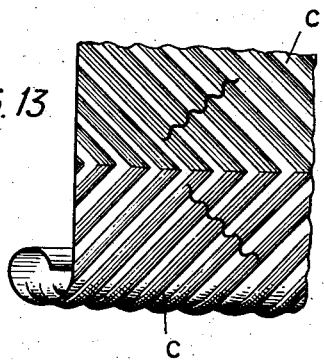

According to the construction shown in Fig. 13, the edge of the blade member is provided with rectangular stamped portions H and of lateral flanges E. Moreover, the curved portions are provided with vertical corrugations similar to those formed on the blade member shown in Fig. 8.

Figure 11:
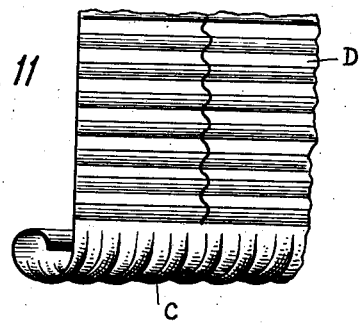
Figure 14:
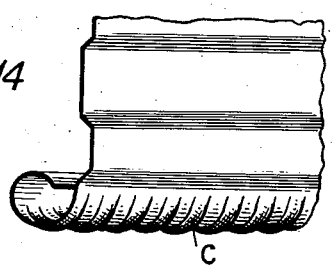

The Figs. 11, 13 and 14 show three other examples of blade members with corrugations horizontal and inclined to the body of the blade member, while the curved edges are provided with the usual vertical corrugations.

These variations in construction may be applied to special cases, for example, for obtaining decorative effects related to the style of the building for which the blinds are intended. In this way one may form corrugations following a Greek or broken line generally, for the 1900 style, etc.

I claim:

1. In rigid roller blinds, blade-members having longitudinal edges curved in such a manner that a transverse section of the said blade-members comprises at each end a curve which is substantially spiral shaped, the said edges having also corrugations the curvature of which is in a plane at right angles to the plane of the curvature of the said edges.

2. In rigid roller blinds, blade-members having longitudinal edges curved in such a manner that a transverse section of the said blade-members comprises at each end a curve which is substantially spiral shaped, the said edges having also corrugations the curvature of which is in a plane at right angles to the plane of the curvature of the said edges, the portions of the blade-members between the two curved edges being provided with corrugations also.

3. In rigid roller blinds, blade-members having longitudinal edges curved in such a manner that a transverse section of the said blade-members comprise at each end a curve which is substantially spiral shaped, the said edges having also corrugations the curvature of which is in a plane at right angles to the plane of the curvature of the said edges, the portions of the blade-members between the two curved edges being provided with transverse corrugations.

4. In rigid roller blinds, blade-members having longitudinal edges curved in such a manner that a transverse section of the said blade-members comprises at each end a curve which is substantially spiral shaped, the said edges having also corrugations the curvature of which is in a plane at right angles to the plane of the curvature of the said edges, a border at the very edge being left free from corrugations.

5. In rigid roller blinds, blade-members having longitudinal edges curved in such a manner that a transverse section of the said blade-members comprises at each end a curve which is substantially spiral shaped, the said edges having also corrugations the curvatures of which is in a plane at right angles to the plane of the curvature of the said edges, a border portion having a width of from ½ to ⅓ of the width of the portion of the said blade-members which is spirally curved being left free from corrugations.

BRUNO NEGRINI.